No. 831,854. PATENTED SEPT. 25, 1906.
A. M. GOW.
GAS PRODUCER.
APPLICATION FILED MAR. 10, 1905.

2 SHEETS—SHEET 1.

WITNESSES
R. A. Balderson.
Warren W. Swartz

INVENTOR
Alexander M. Gow
by Bakewell Byrnes
his attys

No. 831,854. PATENTED SEPT. 25, 1906.
A. M. GOW.
GAS PRODUCER.
APPLICATION FILED MAR. 10, 1905.

2 SHEETS—SHEET 2.

UNITED STATES PATENT OFFICE.

ALEXANDER M. GOW, OF EDGEWOOD PARK, PENNSYLVANIA.

GAS-PRODUCER.

No. 831,854.  Specification of Letters Patent.  Patented Sept. 25, 1906.

Application filed March 10, 1905. Serial No. 249,436.

*To all whom it may concern:*

Be it known that I, ALEXANDER M. GOW, of Edgewood Park, Allegheny county, Pennsylvania, have invented a new and useful Improvement in the Manufacture of Producer-Gas, of which the following is a full, clear, and exact description, reference being had to the accompanying drawings, forming part of this specification, in which—

Figure 1:
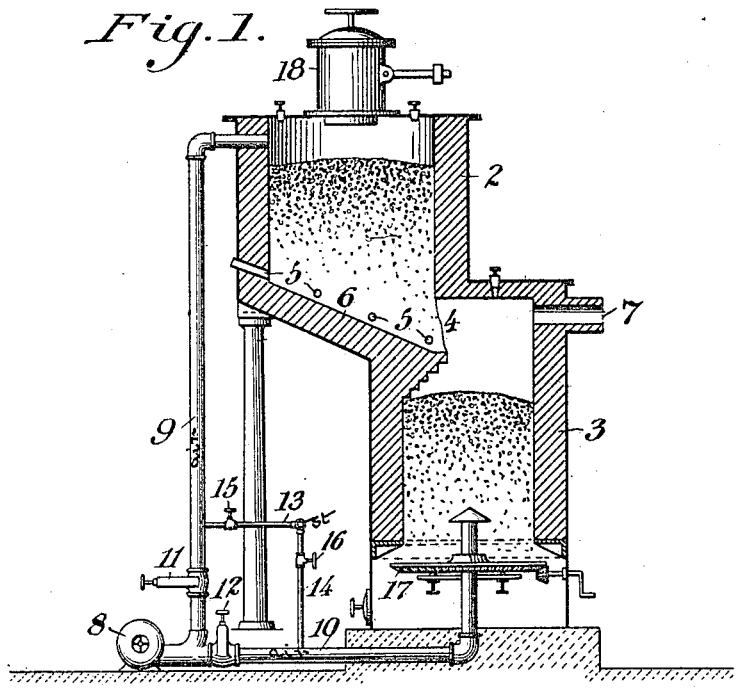
Figure 2:
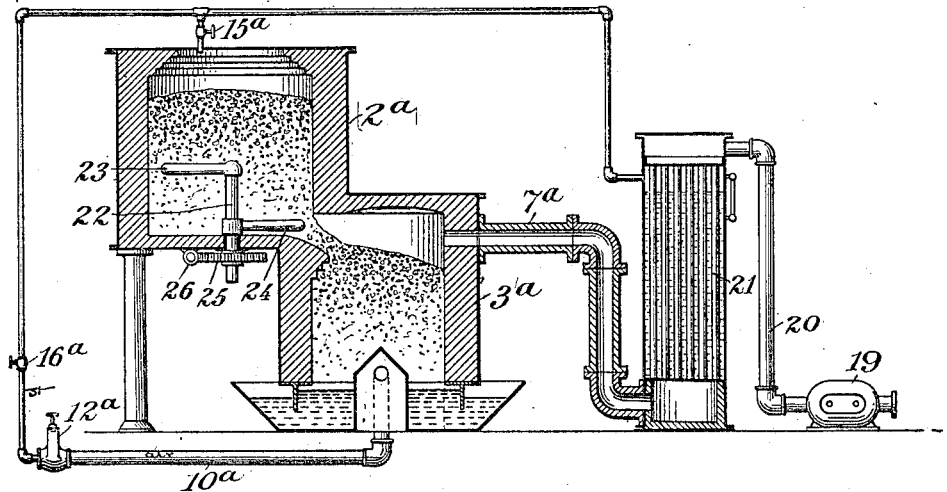
Figure 3:
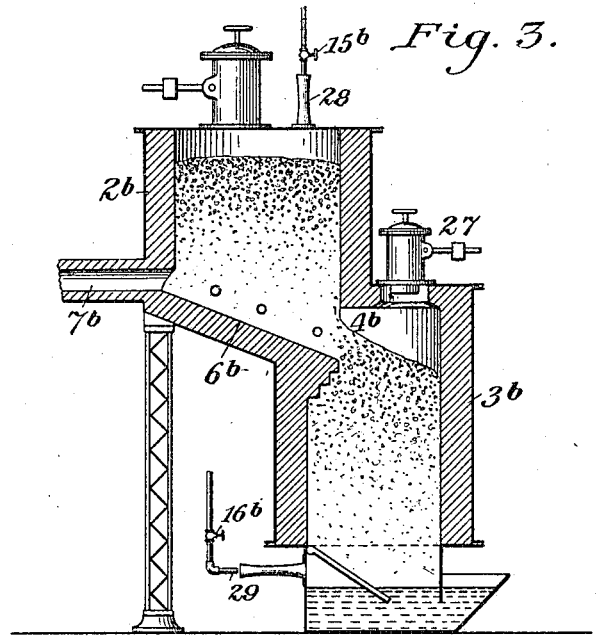
Figure 4:
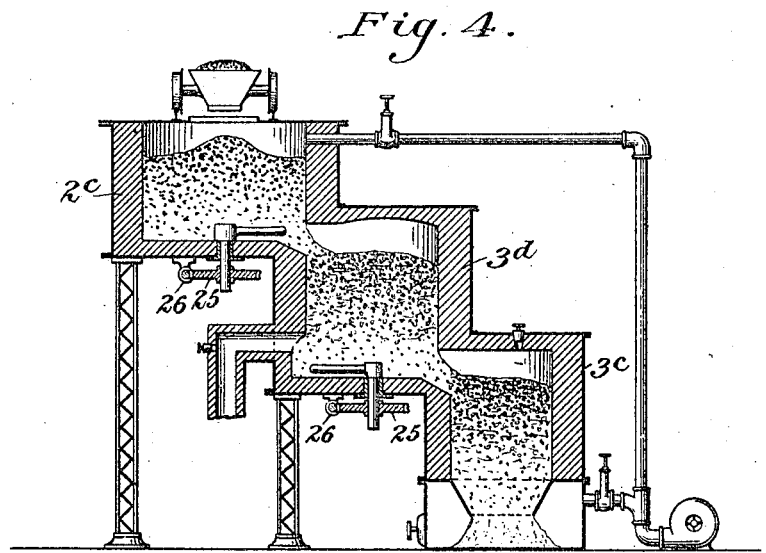

Figure 1 is a sectional side elevation showing one form of my improved apparatus, and Figs. 2, 3, and 4 are similar views showing modified forms.

My invention relates to gas-producers, especially those in which fuel is used containing a large percentage of volatile matter. When such fuels are charged into producers of the ordinary type, the volatile constituents are distilled and pass from the producer as vapors mixed with the gas and to a certain extent, depending on their nature and the temperature to which they have been subjected, condense in the form of heavy oils and tar. In the case of some fuels these condensable vapors represent a large proportion of the heat value of the fuel, and it is desirable that they should, if possible, be converted into fixed gases. They foul the pipes through which the gas passes from the producer, and if the gas is intended for use in gas-engines these condensable vapors seriously interfere with the proper working of the mechanism.

The purpose of my invention is to produce from fuels which contain a high percentage of volatile matter a gas which upon leaving the producing apparatus shall be comparatively free from fine dust and condensable vapors and at the same time to provide an apparatus which shall be capable of continuous operation, not requiring shutting down for the removal of ash or clinker.

It is generally recognized that if in the operation of a producer the air and steam be made to pass downward through the fuel-bed, so that the vapors distilled from a fresh charge of fuel must pass through a body of fuel from which the volatile matter has been driven and which is at high temperature, the heavy hydrocarbon vapors will be broken up into lighter forms, with the liberation of free hydrogen and a deposit of carbon. Producers so operated are usually termed "downdraft" producers. Two practical objections to this method of operation have prevented the general adoption of the downdraft principle: First, the downward passage of the air and steam tends to fill the interstices in the fuel-bed and pack the fire, causing a constant increase in the resistance. Poking the fuel-bed from the top serves but as a temporary relief; and, second, the ash and fuel are so intermingled that it is impossible to remove the ash free from unconsumed carbon. Periodically the entire producer must be emptied of fuel and a fresh start made from a new fuel-bed. Neither of these objections is encountered in the operation of a producer wherein the air and steam pass upward through the fuel-bed. The ash is discharged at the bottom and the ingoing air passing through it removes the last particle of carbon. The passage of air and steam upward has no tendency to pack the fuel-bed, but the fine particles of fuel and the volatile matter of the fresh charge pass from the top of the fuel-bed with the gas made. Consequently the gas is extremely dirty.

The downdraft-producer has the merit of making a clean gas, while the updraft-producer has the merit of making a clean ash. In my apparatus by employing an updraft and downdraft in the same operation I secure the merits of both former types. Furthermore, the combination is such and the apparatus so designed that the fuel-bed in each producer is accessible and under control and each producer may be fed or poked or operated independent of the other, or they may be operated in conjunction in determinable degree as befits the requirements of the fuel used and the grade of gas required.

The apparatus may be designed to work either under suction or pressure, as may be desired.

In the drawings, referring to the form of Fig. 1, 2 is a gas-making chamber arranged to work on the downdraft principle. 3 is a gas-making chamber arranged to work on the updraft principle. 4 is a lateral passage-way connecting the bottom of gas-making chamber 2 with the top of gas-making chamber 3. Poke-holes 5 are provided near the bottom of gas-making chamber 2, through which bars may be inserted to force fuel from the bottom of gas-making chamber 2 through the lateral passage-way 4 into the top of gas-making chamber 3. To assist the fall of the fuel, the bottom 6 of gas-making chamber 2 preferably slopes down toward chamber 3. The gas-offtake 7 is located near the top of gas-making chamber 3. A fan 8 furnishes air to the top of chamber 2 through pipe 9 and to the bottom of chamber 3 through pipe 10. The amount of air so supplied is controlled by means of valve 11 on pipe 9 and valve 12 on pipe 10. If desired, steam may be supplied with the air by means of pipes 13 and 14, the amount being controlled by valves 15 and 16. For the removal of ash from the bottom of chamber 3 a revolving bottom 17 of well-known construction may be used. For charging fuel into chamber 2 a hopper 18 may be provided.

To start the apparatus, both gas-making chambers are filled with coke and fan 8 started. Valves 11 and 12 are opened sufficiently to bring the fuel to incandescence. Fresh fuel is then charged, by means of hopper 18, on the top of the incandescent coke. This fresh fuel is rapidly converted into coke, and the distillates which are driven off pass downward through the mass of hot coke below. As the fuel in chamber 3 is consumed it is replenished from the bottom of chamber 2. Poking fuel from the bottom of chamber 2 tends to keep the fuel in that chamber loose, and by this means the increased resistance due to the downdraft method of operating is obviated. The fuel in chamber 2 is kept at such a depth and supplied with such a quantity of air as will cause it to be thoroughly converted into coke in its passage downward, so that chamber 3 receives fuel from which the volatile constituents have been driven. Consequently the gas made from the fuel in chamber 3 will be free from the objectionable vapors. In addition to the coking action that takes place in chamber 2 it is evident that there will be some consumption of carbon and that the percentage of ash in the fuel charged into chamber 3 will be higher than that in the fresh fuel charged into chamber 2. For this reason chamber 3 is preferably made of smaller diameter than chamber 2, and the depth of fuel carried and the rate of gasification in chamber 3 will depend on the rapidity with which the fuel can be converted into coke in chamber 2. The nature of the fuel will therefore determine the relative diameters of the two producers and the rapidity with which chamber 3 can be charged from chamber 2.

In Fig. 2 I show apparatus arranged to operate under suction and so arranged that the fuel from chamber $2^a$ may be fed to chamber $3^a$ by mechanical means and not by hand-poking, as in Fig. 1. An exhauster or fan 19 is provided having its inlet-pipe 20 connected to the gas-offtake $7^a$ through the steam-boiler 21. This steam-boiler serves to reduce the temperature of the gas to such a degree that the exhauster 19 shall not be injured. It also supplies steam to chambers $2^a$ and $3^a$, the amount being controlled by means of valves $15^a$ $16^a$. A poker 22, having arms 23 and 24, is arranged in the lower part of chamber $2^a$ and may be driven by any convenient means, such as the worm and wheel 25 and 26. If desired, this poker may be water-cooled. The top of chamber 2 is open inasmuch as the chamber is operated under suction. Valve $12^a$ on pipe $10^a$ controls the air-supply to chamber $3^a$. In the operation of this arrangement the resistance on chamber $2^a$ is kept greater than that in chamber $3^a$ by maintaining a deep fuel-bed in chamber $2^a$. Such an arrangement is especially adapted to the gasification of fuel containing a large amount of light refuse not easily fed through a hopper, such as shavings, paper, and miscellaneous rubbish.

It is evident that in the arrangements shown in Figs. 1 and 2 some dust would pass out of the gas-offtake when the fuel was discharged from the upper chamber to the lower chamber. Furthermore, no provision is made for maintaining the fuel-bed in the lower chamber except by charging it from the upper chamber. In Fig. 3 is shown apparatus wherein the gas-offtake $7^b$ is placed at the bottom of chamber $2^b$, so that the gases from chamber $3^b$ must traverse the hot fuel in the lateral passage-way $4^b$, connecting the two chambers, before escaping. Also a hopper 27 is placed on chamber $3^b$, so that in case the fuel is of such nature that owing to the size of the chamber it cannot be fed fast enough from chamber $2^b$ to prevent uncoked fuel passing into chamber $3^b$ then chamber $3^b$ may be fed independently. In such a case chamber $2^b$ is worked slowly to insure a layer of coke resting on the bottom $6^b$, through which must pass the vapors evolved from the fresh fuel charged in chamber $3^b$. It is evident that, if desired, this arrangement may be equipped with the revolving poker, as shown in Fig. 2, the bottom of chamber $2^b$ being preferably made flat and not sloping, as shown. The relative amounts of steam and air to be given to each chamber in the arrangement shown in Fig. 3 are controlled by the steam-injectors 28 and 29, controlled by valves $15^b$ and $16^b$.

For handling fuel containing a very large amount of volatile matter and moisture, such as garbage or peat, the arrangement shown in Fig. 4 is adapted. Here a third gasification-chamber $3^d$ is interposed between the two chambers $2^c$ and $3^c$. Such material cannot be handled in beds of any great depth. It must be handled in comparatively thin layers, owing to the resistance which it affords to the passage of the air and steam when wet. Chambers $2^c$ and $3^d$ are provided with revolving pokers; but it is evident that sloping bottoms, as shown in Figs. 1 and 3, could be used instead, if desired.

If it be desired to make a gas of higher calorific value than ordinary producer-gas derived from the incomplete combustion of fuel with the addition of steam, it is plain that the apparatus may be so operated, for either producer may be operated independently of the other. For instance, the upper downdraft-producer may be operated on air alone until its temperature is sufficiently high and then the air shut off and steam alone admitted. The apparatus therefore lends itself to a wide range of operation, inasmuch as it comprises an updraft-producer, a downdraft-producer, with means for operating and charging each independent of the other or in conjunction with each other in determinable degree on air alone or on mixed steam and air or on steam alone, the vapors evolved passing through a hot layer of fuel from which the volatile constituents have already been driven.

The advantages of my invention result from the combining of the updraft and downdraft principles in the same apparatus. In the combined operation many of the advantages of both forms are obtained, while the amount of gas is increased and the fouling of the conduits is greatly reduced.

Many variations may be made in the form and arrangement of the producer-chambers, the feeding apparatus, and the other parts without departing from my invention.

I claim—

1. A gas-producer having an updraft-chamber and a downdraft-chamber, and a passage-way connecting the top of one of them with the bottom of the other together with means near the bottom of the downdraft-chamber whereby fuel may be discharged therefrom into the updraft-chamber; substantially as described.

2. A gas-producer having an updraft-chamber and a downdraft-chamber out of vertical alinement with each other, a passage-way connecting the top of one of them with the bottom of the other, and a gas-offtake located adjacent to the connecting passage-way and means whereby said chambers may be charged each independent of the other; substantially as described.

3. A gas-producer having an updraft-chamber and a downdraft-chamber, said chambers being offset vertically from each other a laterally-extending passage-way connecting the top of one of them with the bottom of the other, and means for controlling the steam and air passing to one chamber independently of that passing to the other; substantially as described.

4. A gas-producer having two chambers, offset from each other vertically, and with a lateral passage-way between them, said passage-way being arranged to feed fuel from the bottom of the downdraft-chamber to the top of the updraft-chamber; substantially as described.

5. A gas-producer having two chambers, offset from each other vertically, and with a lateral passage-way between them, said passage-way being arranged to feed fuel from the bottom of the downdraft-chamber to the top of the updraft-chamber, and a gas-offtake located adjacent to the passage-way; substantially as described.

6. A gas-producer having two chambers offset from each other vertically, and connected by a laterally-extending passage-way, said passage-way being arranged to feed fuel from the bottom of the upper chamber to the top of the lower chamber, said lower chamber being of less diameter than the upper chamber, and a gas-offtake located adjacent to said passage-way; substantially as described.

7. A gas-producer having two chambers offset from each other vertically, and connected by a laterally-extending passage-way, said passage-way being arranged to feed fuel from the bottom of the upper chamber to the top of the lower chamber, means at the bottom of the upper chamber for positively feeding the fuel, and a gas-offtake located adjacent to said passage-way; substantially as described.

8. A gas-producer having a downdraft-chamber, an updraft-chamber, and an intermediate gasification-chamber, said chambers being out of vertical alinement and connected with each other by lateral passages, and a gas-offtake intermediate the up and down draft chambers; substantially as described.

9. A gas-producer having a downdraft-chamber, an updraft-chamber, a laterally-extending passage connecting said chamber, a gas-offtake adjacent to said passage-way, and means for supplying fuel to each of said chambers independently; substantially as described.

In testimony whereof I have hereunto set my hand.

ALEXANDER M. GOW.

Witnesses:
GEO. B. BLEMING,
JOHN MILLER.